US008979582B2

(12) United States Patent
Tanaka et al.

(10) Patent No.: US 8,979,582 B2
(45) Date of Patent: Mar. 17, 2015

(54) CONNECTOR

(75) Inventors: Tomoo Tanaka, Makinohara (JP);
Hirosi Kawamura, Makinohara (JP);
Masami Mihara, Ichihara (JP);
Kazuhiro Nakata, Ichihara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/982,876

(22) PCT Filed: Feb. 8, 2012

(86) PCT No.: PCT/JP2012/000827
§ 371 (c)(1),
(2), (4) Date: Jul. 31, 2013

(87) PCT Pub. No.: WO2012/108191
PCT Pub. Date: Aug. 16, 2012

(65) Prior Publication Data
US 2013/0309905 A1 Nov. 21, 2013

(30) Foreign Application Priority Data
Feb. 9, 2011 (JP) .................... 2011-025991

(51) Int. Cl.
*H01R 13/40* (2006.01)
*H01R 13/52* (2006.01)
(52) U.S. Cl.
CPC .......... *H01R 13/521* (2013.01); *H01R 13/5205* (2013.01)
USPC ......................................... 439/587; 439/606
(58) Field of Classification Search
USPC ....................................... 439/606
See application file for complete search history.

(56) References Cited

U.S. PATENT DOCUMENTS 5,990,217 A   11/1999   Nakano et al.
6,981,897 B2 *  1/2006   Sakatani ................. 439/606
(Continued)

FOREIGN PATENT DOCUMENTS

JP   01-182350 A   7/1989
JP   09-100377 A   4/1997
(Continued)

OTHER PUBLICATIONS

International Search Report and written opinion dated Apr. 24, 2012, issued for PCT/JP2012/000827.
Office Action mailed Dec. 2, 2014, issued for the Japanese patent application No. 2011-025991 and English translation thereof.

*Primary Examiner* — Xuong Chung Trans
(74) *Attorney, Agent, or Firm* — Edwards Wildman Palmer LLP

(57) ABSTRACT

The present invention provides a connector, which may comprise a terminal fitting, a connector housing having a terminal receiving chamber in which the terminal fitting is at least partly disposed, and a waterproof body formed of thermoplastic elastomer composition. The thermoplastic elastomer composition may comprise (A) styrene-based elastomer component and (B) syndiotactic polystyrene-based polymer component. (A) Styrene-based elastomer component may comprise (A1) acid-modified styrene-based elastomer and (A2) unmodified styrene-based elastomer. The mass ratio of (A1) acid-modified styrene-based elastomer to the sum of (A1) acid-modified styrene-based elastomer, and (A2) unmodified styrene-based elastomer (A1/(A1+A2)) may be from 0.9 to 0.1. The mass ratio of the (A) styrene-based elastomer component to (B) syndiotactic polystyrene-based polymer component may be from 60:40 to 90:10.

9 Claims, 4 Drawing Sheets

(56) References Cited

U.S. PATENT DOCUMENTS 8,449,328 B2 * 5/2013 Ooki ............................ 439/606
8,480,421 B2 * 7/2013 Yoshioka et al. ............. 439/275
8,501,847 B2 * 8/2013 Ooki ............................ 524/147

FOREIGN PATENT DOCUMENTS

| JP | 2005-132922 A | 5/2005 |
| JP | 2009-292898 A | 12/2009 |
| JP | 2011-014260 A | 1/2011 |

* cited by examiner

ADDITIVE AMOUNT OF FUMARIC ACID-
MODIFIED PPE (PARTS BY MASS)

ADDITIVE AMOUNT OF FUMARIC ACID-
MODIFIED PPE (PARTS BY MASS)

MALEIC ACID MODIFIED SEBS/
(MALEIC ACID MODIFIED SEBS+SEBS)

CONNECTOR

TECHNICAL FIELD

The present application claims priority of Japanese Patent Application No. 2011-025991 filed on Feb. 9, 2011, the disclosure of which is expressly incorporated by reference herein in its entirety.

The present invention relates to a connector disposed in, for example, a wiring harness.

BACKGROUND ART

An electrical control unit (i.e., ECU) mounted to a vehicle such as automobile and two-wheel vehicle is basically disposed in the area which is not affected by water. However, a wiring harness is likely to be disposed through an area which is subject to water permeation (i.e., an area which is affected by water), and thus it should be prevented from water permeation from the wiring harness side into the electrical control unit side. In view of the above, a conventional connector, which can be attached to the terminal portion of an electrical wire of the wiring harness, and is also attached to the electrical control unit, has a terminal fitting, which is connected to the conductor portion of the electrical wire, a connector housing having a terminal receiving chamber (i.e., a terminal receiving space) for receiving the terminal fitting therein, and waterproof body for the prevention of water permeation into the terminal receiving chamber.

Conventionally, heat resistance is needed for waterproof treatment of the wiring harness. In this regard, in order to constitute the afore-mentioned waterproof body, curing resin (e.g., silicon resin) potting approach has been proposed. For example, see JP2009-292898. However, the above curing resin potting approach is time-consuming operation, and the resin used cannot retain its shape alone until being cured. For the reason as set forth above, the resin needs to be flowed into box-shaped container.

Recently, thermoplastic elastomer material which has enhanced heat resistance has been proposed as material for the afore-mentioned waterproof body. For example, see JP 2005-132922 A. However, softening agent should be added to the thermoplastic elastomer material so as to enhance flowability, and filler is added to the thermoplastic elastomer material in terms of morphological stability at an elevated temperature.

Syndiotactic polystyrene-based polymer (hereinafter also called as "SPC") has remarkably high melting point, compared with polymer other than syndiotactic structure, and is subjected to high temperature during heat forming operation. However, the polymer, due to thermal decomposition occurring during the heat forming operation at the elevated temperature, has a tendency to decrease its molecular weight, thereby decreasing mechanical properties.

Conventionally, in order to mechanical properties decrease due to thermal decomposition during the heat forming operation, phenolic antioxidant and triphosphate, or triphosphate, diphosphate, and phenolic antioxidant have been added to the polystyrene-based polymer. Also, it had been well known to add phosphorus-based compound having a specific structure, and phenolic antioxidant to the composition comprising syndiotactic polystyrene-based polymer, and thermoplastic elastomer. For example, see JP H1-182350.

In the case of using the material as described in the above publications in the preparation of the afore-mentioned waterproof body, adhesiveness to the covering portion of the electrical wire, thermal resistance, flexibility is insufficient, and the waterproof properties of the connector is thus insufficient. To solve the above drawbacks and problems, the present invention provides an improved connector having enhanced adhesiveness to the covering portion of the electrical wire, thermal resistance, flexibility, and waterproofness.

SUMMARY OF THE INVENTION

It is an objective of the invention to provide a connector that has enhanced adhesiveness to the covering material of the electrical wire, thermal resistance, flexibility, and waterproofness in comparison with conventional connectors. The connector in accordance with the invention can be suited for a wiring harness.

In one aspect the invention provides a connector, which may comprise a terminal fitting, a connector housing having a terminal receiving chamber in which the terminal fitting is at least partly disposed, and a waterproof body formed of thermoplastic elastomer composition. The thermoplastic elastomer composition may comprise (A) styrene-based elastomer component and (B) syndiotactic polystyrene-based polymer component. (A) Styrene-based elastomer component may comprise (A1) acid-modified styrene-based elastomer and (A2) unmodified styrene-based elastomer. The mass ratio of (A1) acid-modified styrene-based elastomer to the sum of (A1) acid-modified styrene-based elastomer, and (A2) unmodified styrene-based elastomer (A1/(A1+A2)) may be from 0.9 to 0.1. The mass ratio of the (A) styrene-based elastomer component to (B) syndiotactic polystyrene-based polymer component may be from 60:40 to 90:10.

Preferably, wherein the mass ratio of (A1) acid-modified styrene-based elastomer to the sum of (A1) acid-modified styrene-based elastomer, and (A2) unmodified styrene-based elastomer (A1/(A1+A2)) may be from 0.9 to 0.6.

Preferably, (A1) acid-modified styrene-based elastomer may be at least one selected from the group consisting of acid-modified styrene-ethylene-propylene block copolymer, acid-modified styrene-ethylene-butylene-styrene block copolymer, acid-modified styrene-ethylene-propylene-styrene block copolymer, and acid-modified styrene-ethylene-ethylene-propylene-styrene copolymer.

Preferably, (A2) unmodified styrene-based elastomer may be at least one selected from the group consisting of styrene-ethylene-propylene block copolymer, styrene-ethylene-butylene-styrene block copolymer, styrene-ethylene-propylene-styrene block copolymer, and styrene-ethylene-ethylene-propylene styrene copolymer.

Preferably, (A1) acid-modified styrene-based elastomer may be acid-modified styrene-ethylene-butylene-styrene block copolymer.

Preferably, (A2) unmodified styrene-based elastomer may be styrene-ethylene-butylene-styrene block copolymer.

Preferably, (A1) acid-modified styrene-based elastomer may be maleic acid-modified styrene-based elastomer.

Preferably, (A1) acid-modified styrene-based elastomer may be maleic acid-modified styrene-ethylene-butylene-styrene block copolymer.

Preferably, the thermoplastic elastomer composition may further include 1-10 parts by mass of (C) polyphenylene ether component based on 100 total parts by mass of (A) styrene-based elastomer component and (B) syndiotactic polystyrene-based polymer component.

Preferably, (C) polyphenylene ether component may be acid-modified polyphenylene ether.

Preferably, the acid-modified polyphenylene ether may be fumaric acid-modified polyphenylene ether.

BRIEF DESCRIPTION OF THE DRAWINGS

An exemplary embodiment of the invention will hereinafter be described in conjunction with the appended drawings, wherein like designations denote like elements, and wherein.

DETAILED DESCRIPTION OF THE INVENTION

A connector in accordance with one embodiment of the invention will be described in detail with reference to the attached drawings.

Figure 1:
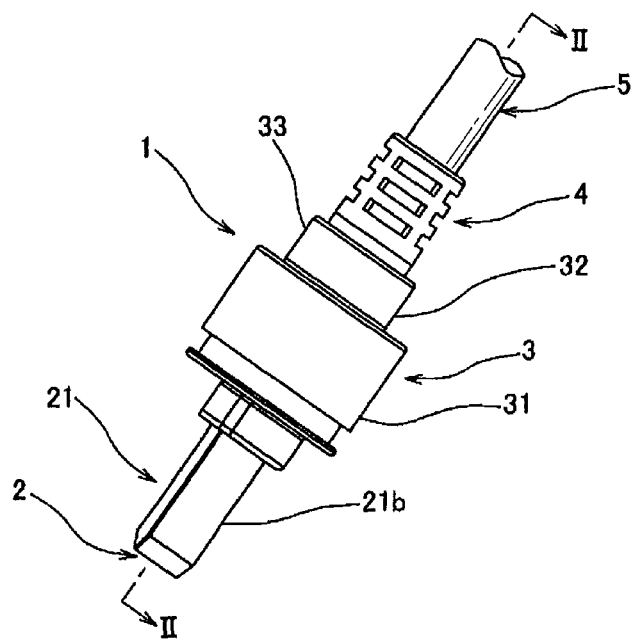
FIG. 1 shows one embodiment of the connector 1 in accordance with the invention.
Figure 2:
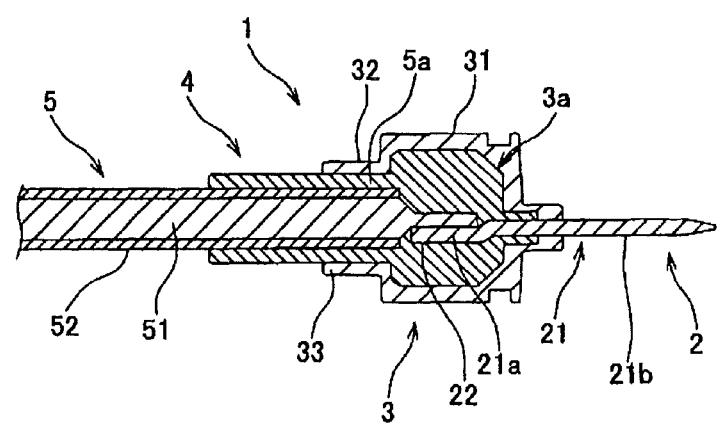
FIG. 2 is a cross-sectional view of the connector 1 along the line II-II.

As shown in FIGS. 1 and 2, a connector 1 in accordance with one embodiment of the invention has a terminal fitting 2, a connector housing 3, and a waterproof body 4.

The terminal fitting 2 is formed by, for example, bending or folding the conductive metallic sheet which is formed of copper alloy material such as brass. Moreover, before or after the bending or folding operation, the terminal fitting 2 may be gold or silver-plated. In other words, the outer surface of the terminal fitting 2 may be formed of copper alloy, tin, silver, or gold. As shown in FIG. 2, the terminal fitting 2 is male-type, and is integrally formed with an electrical connecting portion 21 and an electrical wire connecting portion 22.

The electrical connecting portion 21 may be in the form of band plate. The base end portion 21a of the electrical connecting portion 21 adjacent to the electrical wire connecting portion 22 is embedded into the waterproof body 4. The tip portion 21b of the electrical connecting portion 21 extended from both of the connector housing 3 and the waterproof body 4 is electrically connected to the terminal fitting of the opposing connector (not shown).

On top of the electrical wire connecting portion 22 the conductor portion 51 is placed with the conductor portion 51 being exposed outside at the end portion (i.e., terminal or terminal portion) 5a of the electrical wire 5. The electrical wire connecting portion 22 and the conductor portion 51 are connected to each other by ultrasound or thermal welding. The electrical wire 5 is electrically and mechanically connected to the electrical wire connecting portion 22 via ultrasound or thermal welding. Moreover, the electrical wire 5 may be electrically and mechanically connected to the electrical wire connecting portion 22 such that the conductor portion 51 of the electrical wire 5 is crimped or caulked by a caulking piece(s) which is formed in advance in the electrical wire connecting portion 22.

The electrical wire 5 has a conductor portion 51 and an insulating covering portion 52 disposed over the conductor portion 51. In other words, the electrical wire 5 may be an insulated electrical wire. The conductor portion 51 may be formed of at least one element wire. The element wire may be formed of conductive metallic material such as copper, aluminum and the like. The conductor portion 51 may be formed by twisting element wires together. In other words, the conductor portion 51 may be formed of stranded element wires.

The covering portion 52 is formed of insulating synthetic resin, which may include, but not limited to, polyethylenes, polypropylenes, or polyvinyl chlorides. In other words, the outer surface of the covering portion 52 is formed of synthetic resin such as polyethylenes, polypropylenes, or polyvinyl chlorides. The covering portion 52 is disposed over the conductor portion 51. The covering portion 52 is removed at the area of the end portion (i.e., the terminal) 5a of the electrical portion 5, thereby the conductor portion 51 being exposed outside at the end portion 5a of the electrical wire 5.

The connector housing 3 may be formed of synthetic resin, and may be approximately cylindrically formed. The connector housing 3 is shown to include a first cylindrical portion 31 as a terminal receiving chamber configured to receive the terminal of the electrical wire 5, and the base end portion 21a of the electrical wire connecting portion 21 of the terminal fitting 2 therein. Synthetic resin composition constituting the connector housing 3 is different from thermoplastic elastomer composition constituting the waterproof body 4. The synthetic resin composition for the connector housing 3 may include any known synthetic resin composition for connector housing. Preferably, the synthetic resin composition may contain at least one resin selected from the group consisting of polystyrene-based resin, polyamide-based resin, and polyester-based resin.

The connector housing 3 can be integrally formed with the terminal fitting 2 and the electrical wire 5 during the formation of the thermoplastic elastomer composition into the waterproof body 4. As shown in FIG. 1, the connector housing 3 is integrally formed with the first cylindrical portion 31, and a second cylindrical portion 32. A tubular packing (not shown) formed of elastic material such as rubber is attached to the outer surface of the first cylindrical portion 31.

The first cylindrical portion 31 is cylindrically formed. The inner surface of the first cylindrical portion 31 is in close contact with the outer surface of the tip portion 21b of the electrical connecting portion 21 of the terminal fitting 2. However, the connection between the inner surface of the first cylindrical portion 31 and the outer surface of the tip portion 21b of the electrical connecting portion 21 is not necessarily made watertight.

The second cylindrical portion 32 is also cylindrically formed. The end portion of the second cylindrical portion 32 communicates with the end portion of the first cylindrical portion 31. The end portion (i.e., the terminal) 5a of the electrical wire 5 and the electrical wire connecting portion 22 of the terminal fitting 2 are embedded in the interior of the second cylindrical portion 32. The outer surface of the waterproof body 4 is in close contact with the inner surface of the second cylindrical portion 32. The electrical wire may extend through the end portion 33 of the second cylindrical portion 32 opposite to the first cylindrical portion 31. The end portion 33 can be hereinafter called as an "electrical wire leading portion".

The electrical wire leading portion 33 is cylindrically formed, and is configured to lead the electrical wire 5 with the waterproof body 4 disposed thereover to the exterior of the connector housing 3. The inner surface of the electrical wire leading portion 33 is in close contact with the outer surface of the waterproof body 4 so as to provide watertight connection between the inner surface of the electrical wire leading portion 33 and the outer surface of the waterproof body 4.

The waterproof body 4 is formed of thermoplastic elastomer composition which will be described hereafter in detail. The waterproof body 4 is disposed between the electrical wire leading portion 33 and the terminal 5a of the electrical wire 5 to provide a seal between the electrical wire leading portion 33 and the terminal 5a of the electrical wire 5. The waterproof body 4 is cylindrically formed, as shown in FIG. 1. The waterproof body 4 is integrally formed with the electrical wire 5 and the connector housing 3 by mold formation. As shown in FIG. 2, the waterproof body 4 is at least partly disposed on the covering portion 52 of the electrical wire 5 to keep in close contact with the outer surface of the covering portion 52 of the electrical wire 5. The waterproof body 4 is continuously disposed inside and outside the connector housing 3, as shown in FIG. 2. Moreover, the waterproof body 4 keeps in close contact with the inner surface of the electrical wire leading portion 33. The waterproof body 4 can provide watertight seal or connection between the electrical wire 5 and the electrical wire leading portion 33 such that liquid, such as water, is prevented from penetration along the electrical wire 5 into the first cylindrical portion 31 as the terminal receiving chamber for the connector housing 3, as well as, from attachment to the terminal fitting 2.

The waterproof body 4 may be formed of thermoplastic elastomer composition, which comprises (A) styrene-based elastomer component: comprising (A1) acid-modified styrene-based elastomer, and (A2) unmodified styrene-based elastomer; and (B) syndiotactic polystyrene-based polymer component. The term "syndiotactic polystyrene" as used herein means polystyrene that mainly has syndiotactic structure. Of course, the syndiotactic polystyrene-based polymer used in the invention may have other structure(s) in addition to the syndiotactic structure. In the afore-mentioned thermoplastic elastomer composition in accordance with the invention, the mass ratio of (A1) acid-modified styrene-based elastomer to the sum of (A1) acid-modified styrene-based elastomer, and (A2) unmodified styrene-based elastomer (i.e., A1/(A1+A2)) is from 0.9 to 0.1 (i.e., 0.1 to 0.9), and the mass ratio of the (A) styrene-based elastomer component to (B) syndiotactic polystyrene-based polymer component is from 60:40 to 90:10 (i.e., 60-90:40-10).

A wiring harness, which is connected to electrical or electronic devices placed outdoors, is commonly disposed through an area which is subjected to water permeation (i.e., an area which is affected by water), and thus it should be protected from water penetration or permeation from the wiring harness side into the electrical control unit. In this regard, a connector having a waterproof body formed of the thermoplastic elastomer composition in accordance with the invention can be suitably used in the wiring harness.

In terms of waterproof properties, the acid-modified styrene-based elastomer (A1) may be preferably at least one selected from the group consisting of acid-modified styrene-ethylene-propylene block copolymer, acid-modified styrene-ethylene-butylene-styrene block copolymer, acid-modified styrene-ethylene-propylene-styrene block copolymer, and acid-modified styrene-ethylene-ethylene-propylene-styrene block copolymer, and the unmodified styrene-based elastomer (A2) may be preferably at least one selected from the group consisting of styrene-ethylene-propylene block copolymer, styrene-ethylene-butylene-styrene block copolymer, styrene-ethylene-propylene-styrene block copolymer, and styrene-ethylene-ethylene-propylene styrene block copolymer.

More preferably, the acid-modified styrene-based elastomer (A1) may be acid-modified styrene-ethylene-butylene-styrene block copolymer (acid-modified SEBS), and the unmodified styrene-based elastomer (A2) may be styrene-ethylene-butylene-styrene block copolymer (SEBS).

In one embodiment, the acid-modified styrene-based elastomer (A1) may be maleic acid or fumaric acid-modified styrene-based elastomer. Preferably, the maleic acid-modified styrene-elastomer is employed. Moreover, the acid-modified styrene-based elastomer (A1) preferably has acid number of 1 mg $Ch_3ONa/g$ or above, more preferably, 5 mg $CH_3ONa/g$ or above.

The syndiotactic polystyrene component (i.e., SPS) (B) is characterized that the phenyl groups on the polymer chain are attached to alternating sides of the polymer backbone chain. Normal or atactic polystyrene has no order with regard to the side of the chain on which the phenyl groups are attached. The tacticity may be determined by nuclear magnetic resonance method by use of carbon-13 isotope (i.e., $^{13}C$-NMR).

The tacticity of the syndiotactic structure as measured by $^{13}C$-NMR can be represented by the ratio of two or more adjacent or continuous structural units, for example, diad (i.e., two adjacent structural units), triad (i.e., three continuous structural units), or pentad (i.e., five continuous structural units). In accordance with one embodiment of the invention, there is preferably used (B) the syndiotactic polystyrene-based polymer that has a syndiotacticity of 75% or above, more preferably 85% or above in terms of racemic diad, or 30% or above, more preferably, 50% or above in terms of racemic pentad.

In the syndiotactic polystyrene component (B), the styrene-based polymer may include, but not limited to, polystyrene, poly(alkyl styrene), poly(halogenated styrene), poly (halogenated alkyl styrene), poly(alkoxy styrene), poly(vinyl benzoate), hydrogenated polymer thereof, mixture thereof, or copolymer thereof.

The poly(alkyl styrene) may include, but not limited to, poly(methyl styrene), poly(ethyl styrene), poly(isopropyl styrene), poly (t-butyl styrene), poly(phenyl styrene), poly (vinyl naphthalene), or poly(vinyl styrene). The poly(halogenated styrene) may include, but not limited to, poly(chloro styrene), poly(bromo styrene), or poly(fluoro styrene). The poly(halogenated alkyl styrene) may include, but not limited to, poly(chloromethyl styrene). The poly(alkoxy styrene) may include, but not limited to, poly(methoxy styrene), or poly(ethoxy styrene).

Preferably, the styrene-based polymer may be selected from the group consisting of polystyrene, poly (p-methyl styrene), poly (m-methyl styrene), poly (p-butyl styrene), poly (t-butyl styrene), poly (p-chloro styrene), poly (m-chloro styrene), poly (p-fluoro styrene), hydrogenated polystyrene, and any copolymer thereof.

The syndiotactic polystyrene-based polymer can be obtained by, for example, polymerization of styrene-based monomer, which can constitute the corresponding styrene-based polymer, in the presence of a catalyst of titanium compound and a condensation product of water and trialkyl aluminum, with or without inert or inactive hydrocarbon solvent. For more detail, see JP S62-187708. Moreover, poly (halogenated alkyl styrene) may be prepared in accordance with a process as described in, for example, JP H1-46912. The hydrogenated polymer may be obtained in accordance with, for example, JP H1-178505. The syndiotactic polystyrene-based polymer may be formed of at least one corresponding monomer. In other words, the syndiotactic polystyrene-based polymer in accordance with one embodiment of the invention may be prepared via polymerization of corresponding one monomer, or polymerization of two or more (unit) monomers in combination.

In accordance with one embodiment of the invention, the mass ratio of (A) component to (B) component is from 60:40 to 90:10 (i.e., 60-90:40-10). In this case, the sum of (A) and (B) components will be 100. Preferably, the mass ratio of (A) component to (B) component is from 65:35 to 85:15 (i.e., 65-85:35-15). In this case, the sum of (A) and (B) components will be 100. More preferably, the mass ratio of (A) component to (B) component is from 70:30 to 80:20 (i.e., 70-80:30-20). In this case, the sum of (A) and (B) components will be 100. In a case where (B) component is present in an amount of less than 10 parts by mass based on 100 total parts by mass (i.e., the sum of (A) and (B) components), the resultant composition would fail to provide sufficient heat resistance which can be attained by (B) components. On the other hand, in a case where (B) component is present in an amount of above 40 parts by mass based on 100 total parts by mass (i.e., the sum of (A) and (B) components), the resultant composition would fail to provide sufficient attachment to the covering portion of the electrical wire, which is generally needed for waterproof body.

In one embodiment of the invention, the mass ratio of (A1) acid-modified styrene-based elastomer to the sum of (A1) acid-modified styrene-based elastomer and (A2) unmodified styrene-based elastomer (i.e., the mass ratio of A1/(A1+A2)) is from 0.9 to 0.1 (i.e., 0.1 to 0.9), preferably, from 0.9 to 0.5, more preferably, from 0.9 to 0.6. The combination of (A1) acid-modified styrene-based elastomer and (A2) unmodified styrene-based elastomer within the afore-mentioned range will provide the waterproof body with desired attachment (i.e., adhesion properties) to the covering portion of the electrical wire.

In an embodiment of the invention, the thermoplastic elastomer composition which can be material for waterproof body of connector, may further include 1-10 parts by mass, preferably, 1-7 parts by mass of (C) polyphenylene ether component based on 100 total parts by mass (i.e., the sum of (A) component and (B) component), if needed. In a case where (C) component is added in an amount of 1 part by mass or above, attachment of the thus obtained waterproof body to the covering portion of the electrical wire can be enhanced. In a case where (C) component is added in an amount of 10 parts by mass or below, the extension of the elastomer will not be inhibited, and the desired flexibility will be also obtained.

In a case where the polyphenylene ether employed in one embodiment of the invention is acid-modified polyphenylene ether, the attachment to the covering of the electrical wire will be further enhanced. The acid-modified polyphenylene ether may include, but not limited to, maleic acid or fumaric acid-modified polyphenylene ether. Fumaric acid-modified polyphenylene ether can be preferably employed in the embodiment of the invention.

The polyphenylene ether which may be employed in the embodiment of the invention may include, but not limited to, poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), poly(2,6-dimethyl-1,4-phenylene ether), or acid-modified type(s) thereof. In one embodiment of the invention, poly(2,6-dimethyl-1,4-phenylene ether) can be preferably used. The above polyphenylene ether can be used as single polyphenylene ether, or a combination of two or more polyphenylene ethers in the composition.

The polyphenylene ether as described previously has been well known to one skilled in the art. For example, see U.S. Pat. No. 3,306,874, U.S. Pat. No. 3,306,875, U.S. Pat. No. 3,257,357, and U.S. Pat. No. 3,257,358. The polyphenylene ether is generally prepared via oxidative coupling reaction in the presence of copper amine complex and at least one phenolic compound, which has two or three substituents, thereby producing homopolymer or copolymer. In this regard, the copper amine complex is preferably derived from at least one selected from the group consisting of primary, secondary, and tertiary amines.

A method for manufacture of the acid-modified polyphenylene ether is not limited to any specific processes or methods. For example, the acid-modified polyphenylene ether can be made by a process, comprising the steps of dry blending polyphenylene ether, an acid such as fumaric acid and maleic acid, and a radical generator such as 2,3-dimethyl-2,3-diphenylbutane, and subsequently melt kneading the blend thus obtained at a temperature of from 150 to 350 degrees Celsius, particularly from 250 to 330 Degrees Celsius, by use of, for example, a biaxial extruder.

In one embodiment of the invention, the thermoplastic elastomer resin composition, which can be material for waterproof body of connector, may further include antioxidant component in an amount of 5% by mass or below for the purpose of enhancing heat stability in both compound itself and (final) product.

In one embodiment of the invention, the antioxidant may includes, but not limited to, pentaerythritol tetrakis [3-(3,5-di-t-butyl-4-hydroxyphenyl)propionate obtainable from BASF Corporation (product name: IRGANOX1010), bis-(2, 6-di-tert-butyl-methylphenyl)pentaerythritol diphosphide obtainable from ADEKA Corporation (product name: ADK STAB PEP-36), 1,3,5-tris-(3',5'-di-tert-butyl-4-hydroxybenzyl)isocyanuric acid obtainable from ADEKA Corporation (product name: ADK STAB AO-20), and etc.

The thermoplastic elastomer composition which can constitute the waterproof body of the connector may be prepared in accordance with the known method. For example, the thermoplastic elastomer resin composition in accordance with one embodiment of the invention can be prepared by a process, comprising the steps of mixing the above components at an ambient temperature, and subsequently melt kneading the mixture thus obtained. In the step of melting kneading, a biaxial extruder may be preferably used.

In the step of melt kneading using the biaxial extruder, the blend or mixture may be subjected to kneading at a temperature of the melting point of the syndiotactic polystyrene-based polymer or above, and 350 degrees Celsius or below. In a case where the kneading is carried out at a temperature of the melting point of the syndiotactic polystyrene-based polymer or above, extreme increase of viscosity is suppressed, thereby preventing the decrease of productivity. On the other hand, in a case where the kneading is carried out at a temperature of 350 degrees Celsius or below, the syndiotactic polystyrene-based polymer can be avoided from thermal decomposition. The kneading is preferably carried out at a temperature of above the melting point of the syndiotactic polystyrene-based polymer, and 330 degrees Celsius or below.

The thermoplastic elastomer composition thus obtained can constitute the waterproof body as shown in FIGS. 1 and 2.

In one embodiment of the invention, a method for forming the waterproof body 4 surrounding the terminal 5a of the electrical wire 5, the base end portion 21a of the electrical connecting portion 21 of the terminal fitting 2 attached to the electrical wire 5, and the electrical wire connecting portion 22 is not specifically limited. In other words, the waterproof body 4 may be formed by the well known method such as injection molding and extrusion molding. In the case of injection molding, molding is preferably carried out at a temperature which is the melting point of syndiotactic polystyrene-based polymer used or above, and is 350 degrees Celsius or below. In a case where the molding is carried out at a temperature of melting point of the syndiotactic polystyrene-based polymer or above, the decrease of flowability can be suppressed. On the other hand, in a case where the molding is carried out at a temperature 350 degrees Celsius or below, the syndiotactic polystyrene-based polymer is protected from thermal decomposition. The tool or die temperature is preferably from 40 degrees Celsius to 100 degrees Celsius, more preferably, 40 degrees Celsius to 80 degrees Celsius. In a case where the tool or die temperature is set to 40 degrees Celsius or above, the syndiotactic polystyrene-based polymer can be sufficiently crystallized, thereby allowing for the intended advantageous effect sought by the use of syndiotactic polystyrene-based polymer. Also, in a case where the tool or die temperature is set to 100 degrees Celsius or below, the waterproof body is prevented from being molten within the tool or die.

Subsequently, the housing 3 is formed adjacent to the waterproof body 4 with at least partly surrounding the waterproof body 4. In other words, the corresponding portion adjacent to the waterproof body 4 is fixed to the desired site or position within a second die or tool (not shown), and then the resin material for the connector housing 3, which has been melt kneaded, is supplied into the second die or tool so as to form the connector housing 3. After the formation of the connector housing 3, all of the terminal fitting 2, the connector housing 3, and the electrical wire 5, which are integrally formed, are removed from the second die or tool. As such, the connector 1 as shown in FIGS. 1 and 2 is provided.

EXAMPLES

It is to be understood that the following description is not a definition of the invention itself, but is a description of one or more preferred exemplary embodiments of the invention. The invention is not limited to the particular embodiment(s) disclosed herein.

The physical properties of the examples and comparative examples were examined and evaluated as follows.

(1) Peeling Stress (Peel Strength)

A material sheet for a covering of an electrical wire, having a size of 127 mm×13 mm, and a thickness of 2 mm was attached via insert molding to a sheet for waterproof body, formed of thermoplastic elastomer composition, and having a size of 127 mm×13 mm and a thickness of 1.2 mm. Peeling stress (i.e., peel strength) was measured using an T-Peel Tester which was obtained from INSTRON (product name: 5567P7529) at a speed of 25 mm/min.

(2) Vicat Softening Temperature

Vicat Softening Temperature was determined in accordance with JIS K7206.

(3) Breaking Elongation

Breaking elongation or breaking extension was determined in accordance with ASTM D638.

(4) Evaluation of Sealing Properties

A connector as shown in FIG. 1 was prepared from thermoplastic elastomer composition in the form of pellet, which can provide the waterproof body of the embodiment of the invention. The connector thus obtained was fixed to aluminum tool with a tube connected thereto, and was placed in water. Compressed air of 10.0 kPa was supplied from the tube to the tool for 30 seconds. Particularly, compressed air was provided to the connection of the waterproof body 4 and the electrical wire 5 (i.e., between the waterproof body 4 and the electrical wire 5). There was measured the leakage of the compressed air from the connection of the waterproof body 4 and the electrical wire 5. In there was detected no leakage of compressed air, the pressure of the compressed air was elevated up to 200 kPa in increments of 10.0 kPa. Once the leakage of compressed air was detected, the pressure at which the leakage was detected was recorded as sealing pressure. If the sealing pressure was 100 kPa or above, the corresponding connector was considered to have good or sufficient sealing properties. In this case, "O" was recorded. If the sealing pressure was lower than 100 kPa, the corresponding connector was considered to have poor or insufficient sealing properties. In this case, "X" was recorded.

Preparation 1 (example)

Preparation of Fumaric Acid-Modified Polyphenylene Ether 1 kg of Polyphenylene ether (intrinsic viscosity: 0.45 deciliters/g in chloroform at 25 degree Celsius), 30 g of fumaric acid, and 20 g of radical generator, 2,3-dimethyl-2,3-diphenyl butane obtained from NOF Corporation (product name: NOHMER BC) were subjected to dry blending, and then melt kneading at a preset temperature of 300 degrees Celsius using 30 mm biaxial extruder having screw rotation speed of 200 rpm. At this stage, the temperature of the resin was about 331 degrees Celsius.

The resulting resin was cooled, and pelletized to provide fumaric acid-modified polyphenylene ether. In order to measure its modification ratio or degree of modification, 1 g of the resultant fumaric acid-modified polyphenylene ether was dissolved in ethyl benzene, and then methanol to recover precipitated polymers. The recovered polymer was subjected to soxhlet extraction, and then dried. Modification ratio or degree of modification of the polymer was determined by carbonyl absorption of infrared ray spectrum, and titration. The measured modification ratio or degree of modification was 1.45% by mass.

Examples 1-21, and Comparative Examples 1-2

The components as listed in Tables 1-3 below were subjected to dry blending, and then melt kneading at a temperature of 290 degree Celsius (i.e., cylinder temperature) using a biaxial extruder. The resultant extruded blend thus obtained was cooled in water bath, and then pelletized to provide composition. The resultant composition was investigated for the afore-mentioned physical properties. The results are shown in Tables 1-3 as listed below.
(A) Styrene-Based Elastomer
(A1) Acid-Modified Styrene-Based Elastomer
Maleic acid-modified styrene-ethylene-butylene-styrene block copolymer as obtained from Asahi Kasei Corporation (product name: TAFTECH M1913; styrene/ethylenebutylene mass ratio: 30/70; MFR (melt flow index; temperature: 230 degrees Celsius; load: 2.16 Kgf): 5 g/10 minutes; acid number: 10 mg $CH_3ONa/g$)

(A2) Unmodified Styrene-Based Elastomer
Styrene-ethylene-butylene-styrene block copolymer as obtained from Asahi Kasei Corporation (product name: TAFTECH H1041; styrene/ethylenebutylene mass ratio: 30/70; MFR (melt flow index; temperature: 230 degrees Celsius; load: 2.16 Kgf): 5 g/10 minutes)

(B) Syndiotactic Polystyrene-Based Polymer (SPS)
Homosyndiotactic polystyrene as obtained from Idemitsu Kosan Co., Ltd. (product name: XAREC130ZC; racemic pendant tacticity: 98%, MFR (at 300 degree Celsius, a load of 1.2 Kgf): 13 g/10 minutes)

(C) Acid-Modified Polyphenylene Ether (i.e., Acid-Modified PPE)
The same fumaric acid-modified phenylene ether as prepared previously was used.

TABLE 1

| | Example1 | Example2 | Example3 | Example4 | Example5 | Comparative example1 | Comparative example2 | Comparative example3 |
|---|---|---|---|---|---|---|---|---|
| Composition(parts by mass) | | | | | | | | |
| (A)Styrene-based elastomer | | | | | | | | |
| (A1)Acid-modified styrene-based elastomer | 95 | 85 | 80 | 70 | 60 | 100 | 40 | 20 |
| (A2)Unmodified styrene-based elastomer | | | | | | | | |
| (B)SPS | 5 | 15 | 20 | 30 | 40 | | 60 | 80 |
| (C)Fumaric acid-modified polyphenylene ether | | | | | | | | |
| Results of physical measurement | | | | | | | | |
| (1)Peeling Stress(N · $cm^{-1}$) | 50 | 14.1 | 8.5 | 3.1 | 1.7 | 37 | 1.4 | 0.9 |
| (2)Vicat Softening Temperature(° C.) | 47.2 | 52.0 | 54.3 | 57.5 | 62.4 | 45.2 | 71.5 | 81.0 |
| (3)Breaking Elongation(%) | 550 | 480 | 415 | 230 | 80 | 580 | 21 | 13 |
| Results of sealing measurement | | | | | | | | |
| Sealing Properties(kPa) | 200 or above | 200 or above | 200 or above | 200 or above | 130 | 200 or above | 60 | 10 |
| Evaluation | ○ | ○ | ○ | ○ | ○ | ○ | x | x |

TABLE 2

| | Example7 | Example8 | Example9 | Example10 | Example11 | Example12 | Example13 | Example14 |
|---|---|---|---|---|---|---|---|---|
| Composition(parts by mass) | | | | | | | | |
| (A)Styrene-based elastomer | | | | | | | | |
| (A1)Acid-modified styrene-based elastomer | 7.5 | 22.5 | 37.5 | 52.5 | 67.5 | 15 | 20 | 30 |
| (A2)Unmodified styrene-based elastomer | 67.5 | 52.5 | 37.5 | 22.5 | 7.5 | 45 | 40 | 30 |
| (B)SPS | 25 | 25 | 25 | 25 | 25 | 40 | 40 | 40 |
| (C)Fumaric acid-modified polyphenylene ether | | | | | | | | |
| Results of physical measurement | | | | | | | | |
| (1)Peeling Stress(N · $cm^{-1}$) | 2.1 | 2.0 | 5.6 | 5.8 | 5.8 | 1.1 | 1.05 | 1.35 |
| (2)Vicat Softening Temperature(° C.) | 56.1 | 55.8 | 56.2 | 56.0 | 56.4 | 71.0 | 70.5 | 71.3 |
| (3)Breaking Elongation(%) | 370 | 370 | 330 | 320 | 328 | 24.5 | 26.0 | 21.3 |
| Results of sealing measurement | | | | | | | | |
| Sealing Properties(kPa) | 140 | 160 | 200 or above | 200 or above | 200 or above | 100 | 110 | 120 |
| Evaluation | ○ | ○ | ○ | ○ | ○ | ○ | ○ | ○ |

TABLE 2

|  | Example15 | Example16 | Example17 | Example18 | Example19 | Example20 | Example21 |
|---|---|---|---|---|---|---|---|
| Composition(parts by mass) | | | | | | | |
| (A)Styrene-based elastomer | | | | | | | |
| (A1)Acid-modified styrene-based elastomer | 40 | 45 | 60 | 60 | 60 | 60 | 60 |
| (A2)Unmodified styrene-based elastomer | 20 | 15 | | | | | |
| (B)SPS | 40 | 40 | 40 | 40 | 40 | 40 | 40 |
| (C)Fumaric acid-modified polyphenylene ether | | | 3 | 5 | 7 | 10 | 13 |
| Results of physical measurement | | | | | | | |
| (1)Peeling Stress(N · cm$^{-1}$) | 1.41 | 1.38 | 1.8 | 2.3 | 2.7 | 3.2 | 3.5 |
| (2)Vicat Softening Temperature(° C.) | 71.1 | 70.2 | 71.8 | 72.1 | 72.6 | 73.2 | 73.7 |
| (3)Breaking Elongation(%) | 20.4 | 20.0 | 19.6 | 16.8 | 13.2 | 10.4 | 8.1 |
| Results of sealing measurement | | | | | | | |
| Sealing Properties(kPa) | 130 | 130 | 130 | 130 | 140 | 150 | 150 |
| Evaluation | ○ | ○ | ○ | ○ | ○ | ○ | ○ |

Figure 3:
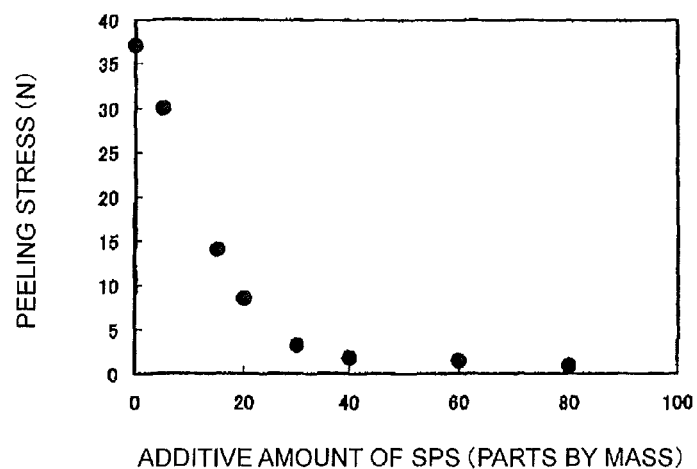
FIG. 3 is a graph that shows the relationship between the additive amount of syndiotactic polystyrene-based polymer (i.e., SPS) and peeling stress (N)
Figure 4:
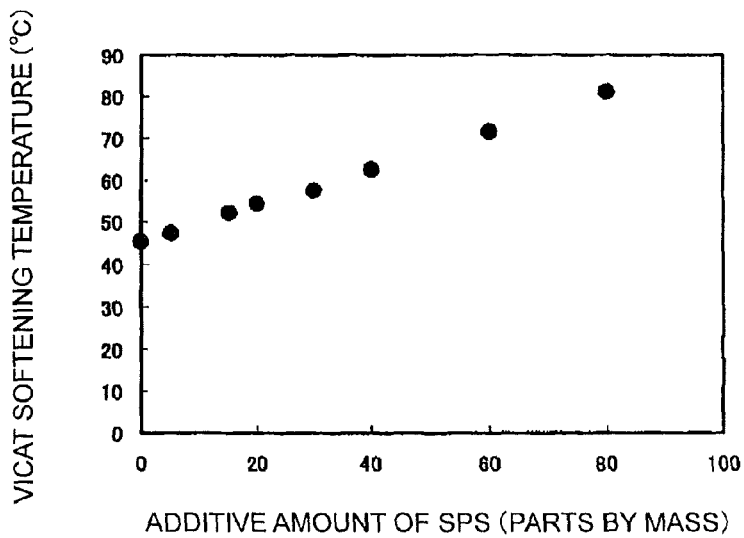
FIG. 4 is a graph that shows the relationship between the additive amount of syndiotactic polystyrene-based polymer (i.e., SPS) and Vicat softening temperature (degrees Celsius)
Figure 5:
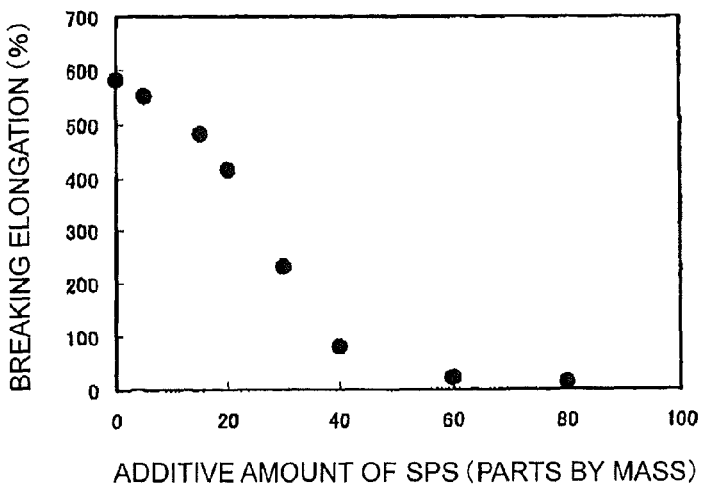
FIG. 5 is a graph that shows the relationship between the additive amount of syndiotactic polystyrene-based polymer (i.e., SPS) and breaking elongation (%)

The results from Examples 1-6 and Comparative examples 1-2 are shown in FIGS. 3-5. For more detail, FIG. 3 is a graph that shows the relationship between the additive amount of syndiotactic polystyrene-based polymer (i.e., SPS) and peeling stress (N); FIG. 4 is a graph that shows the relationship between the additive amount of syndiotactic polystyrene-based polymer (i.e., SPS) and Vicat softening temperature (degrees Celsius); and FIG. 5 is a graph that shows the relationship between the additive amount of syndiotactic polystyrene-based polymer (i.e., SPS) and breaking elongation (%).

Figure 6:
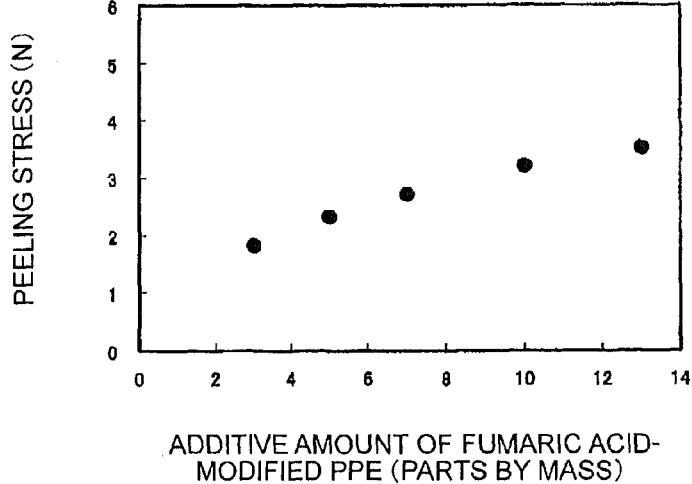
FIG. 6 is a graph that shows the relationship between the additive amount of fumaric acid-modified polyphenylene ether (i.e., fumaric acid-modified PPE), and peeling stress (N)
Figure 7:
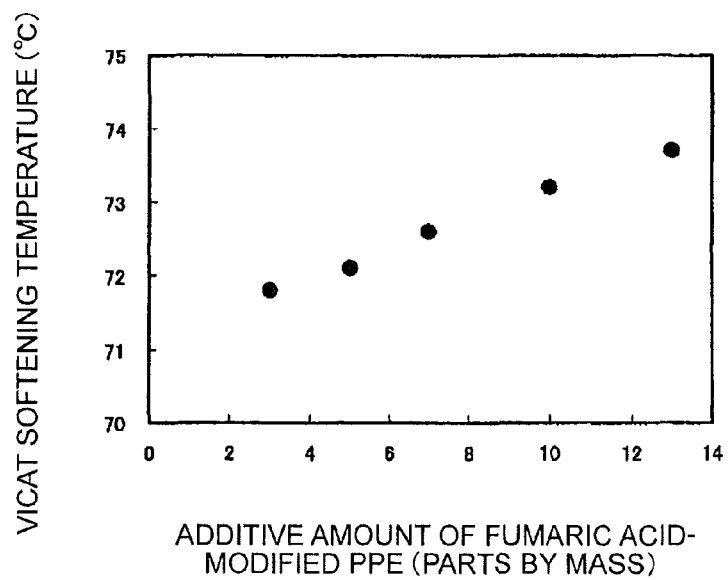
FIG. 7 is a graph that shows the relationship between the additive amount of fumaric acid-modified polyphenylene ether (i.e., fumaric acid-modified PPE) and Vicat softening temperature (degrees Celsius)
Figure 8:
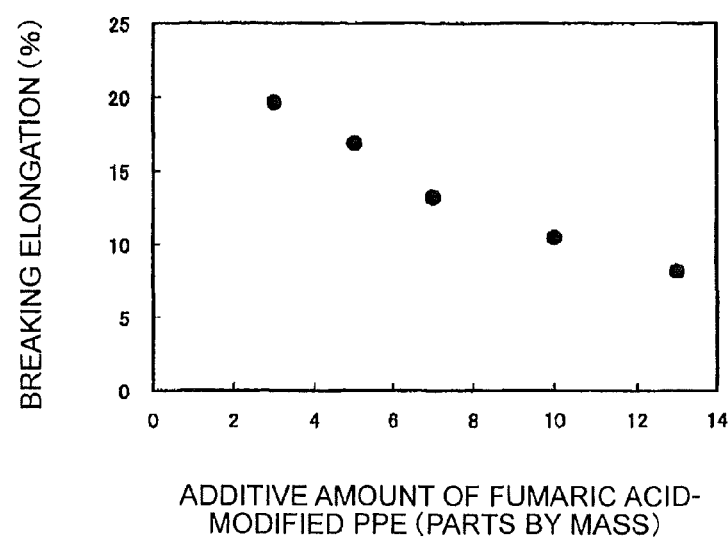
FIG. 8 is a graph that shows the relationship between the additive amount of fumaric acid-modified polyphenylene ether (i.e., fumaric acid-modified PPE) and breaking elongation (%).
Figure 9:
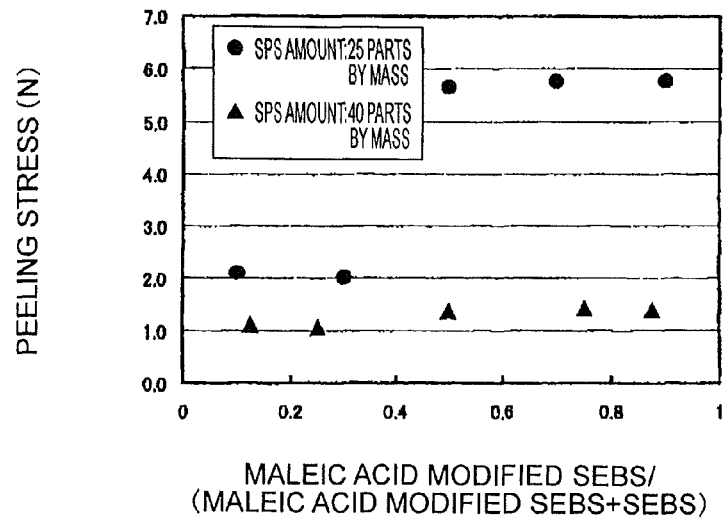
FIG. 9 is a graph that shows the relationship between the mass ratio of (maleic acid-modified styrene-ethylene-butylene-styrene block copolymer (i.e., maleic acid-modified SEBS) to (maleic acid-modified styrene-ethylene-butylene-styrene block copolymer (i.e., maleic acid-modified SEBS)+ unmodified styrene-ethylene-butylene-styrene block copolymer (i.e., SEBS)) and peeling stress (N)
Figure 10:
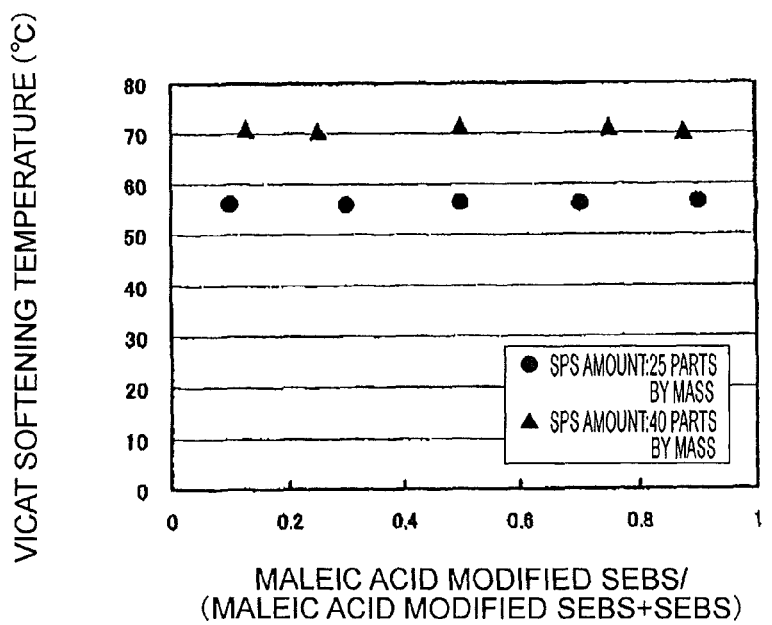
FIG. 10 is a graph that shows the mass ratio of (maleic acid-modified SEBS) to (maleic acid-modified SEBS+ SEBS) and Vicat softening temperature (degrees Celsius)
Figure 11:
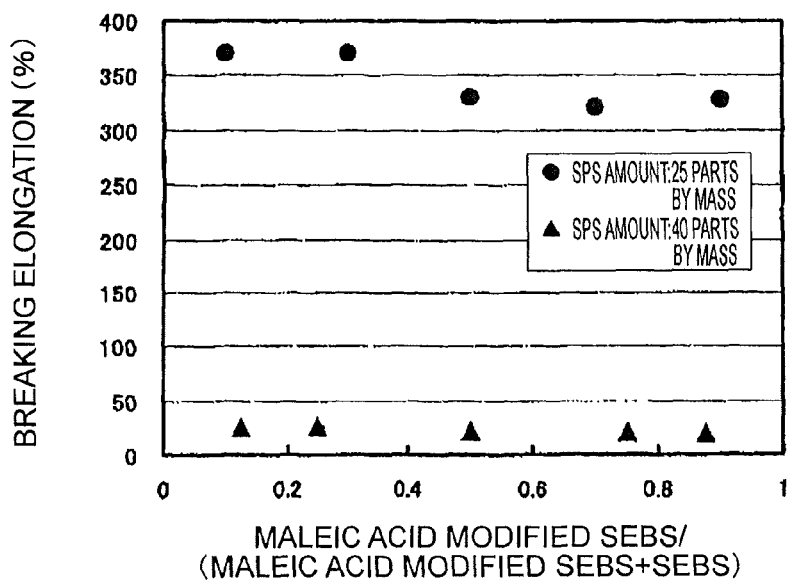
FIG. 11 is a graph that shows the mass ratio of (maleic acid-modified SEBS) to (maleic acid-modified SEBS+ SEBS) and breaking elongation (%).

The results from Examples 7-21 are shown in FIGS. 6-8. For more detail, FIG. 6 is a graph that shows the relationship between the additive amount of fumaric acid-modified polyphenylene ether (i.e., fumaric acid-modified PPE), and peeling stress (N); FIG. 7 is a graph that shows the relationship between the additive amount of fumaric acid-modified polyphenylene ether (i.e., fumaric acid-modified PPE) and Vicat softening temperature (Degrees Celsius); and FIG. 8 is a graph that shows the relationship between the additive amount of fumaric acid-modified polyphenylene ether (i.e., fumaric acid-modified PPE) and breaking elongation (%). The results from Examples 7-21 in which SBS was added in amount of 25 parts by mass or 40 parts by mass are shown in FIGS. 9-11. For more detail, FIG. 9 is a graph that shows the relationship between the mass ratio of (maleic acid-modified SEBS) to (maleic acid-modified SEB+SEBS) and peeling stress (N); FIG. 10 is a graph that shows the mass ratio of (maleic acid-modified SEBS) to (maleic acid-modified SEBS+SEBS) and Vicat softening temperature (Degrees Celsius); FIG. 11 is a graph that shows mass ratio of (maleic acid-modified SEBS) to (maleic acid-modified SEBS+SEBS) and breaking elongation (%).

In accordance with the experiments, the followings were identified;

(1) Addition of syndiotactic polystyrene-based polymer (SPS) to the styrene-based elastomer raised Vicat softening temperature, thereby enhancing thermal resistance (i.e., heat resistance), as well as, allowing a waterproof body to be formed via rapid injection molding without a conventional potting method;

(2) Addition of polyphenylene ether (PPE) to the styrene-based elastomer raised Vicat softening temperature, elevated peeling stress, and enhanced adhesion properties. However, the use of polyphenylene ether in the styrene-based elastomer had a tendency to lower breaking elongation. Accordingly, the content of polyphenylene ether in the styrene-based elastomer can be properly controlled depending on a wiring harness used, if necessary; and (3) In accordance with FIG. 9, in the composition in which syndiotactic polystyrene-based polymer was added in an amount of 25 parts by mass, the use of the acid-modified styrene-based elastomer in an amount of 50% or above (i.e., the ratio of A1/(A1+A2) of 0.5 or above) caused peeling stress to remarkably increase.

The present invention provides a thermoplastic elastomer composition for waterproof body of a connector, having enhanced adhesiveness to the covering material of an electrical wire, thermal resistance, durability, flexibility, and waterproofness. A connector having the waterproof body formed of the thermoplastic elastomer composition of the invention is suited for a wiring harness.

Other embodiments and uses of the invention will be apparent to those skilled in the art from consideration from the specification and practice of the invention disclosed herein. It is understood that the invention is not limited to the embodiments and/or examples herein described, but embraces such modified forms thereof as come within the scope of the following claims.

The invention claimed is:

1. A connector, comprising:
a terminal fitting,
a connector housing having a terminal receiving chamber in which the terminal fitting is at least partly disposed, and
a waterproof body formed of thermoplastic elastomer composition comprising (A) styrene-based elastomer component and (B) syndiotactic polystyrene-based polymer component, wherein (A) styrene-based elastomer component comprises (A1) acid-modified styrene-based elastomer and (A2) unmodified styrene-based elastomer, wherein mass ratio of (A1) acid-modified styrene-based elastomer to the sum of (A1) acid-modified styrene-based elastomer and (A2) unmodified styrene-based elastomer (A1/(A1+A2)) is from 0.9 to 0.1, and wherein the mass ratio of the (A) styrene-based elastomer component to (B) syndiotactic polystyrene-based polymer component is from 60:40 to 90:10.

2. The connector according to claim 1, wherein the mass ratio of (A1) acid-modified styrene-based elastomer to the sum of (A1) acid-modified styrene-based elastomer and (A2) unmodified styrene-based elastomer (A1/(A1+A2)) is from 0.9 to 0.6.

3. The connector according to claim 1, wherein (A1) acid-modified styrene-based elastomer is at least one selected from the group consisting of acid-modified styrene-ethylene-propylene block copolymer, acid-modified styrene-ethylene-butylene-styrene block copolymer, acid-modified styrene-ethylene-propylene-styrene block copolymer, and acid-modified styrene-ethylene-ethylene-propylene-styrene block copolymer, and wherein (A2) unmodified styrene-based elastomer is at least one selected from the group consisting of styrene-ethylene-propylene block copolymer, styrene-ethylene-butylene-styrene block copolymer, styrene-ethylene-propylene-styrene block copolymer, and styrene-ethylene-ethylene-propylene-styrene block copolymer.

4. The connector according to claim 3, wherein (A1) acid-modified styrene-based elastomer is acid-modified styrene-ethylene-butylene-styrene block copolymer, and wherein (A2) unmodified styrene-based elastomer is styrene-ethylene-butylene-styrene block copolymer.

5. The connector according to claim 1, wherein (A1) acid-modified styrene-based elastomer is maleic acid-modified styrene-based elastomer.

6. The connector according to any of claims 5, wherein (A1) acid-modified styrene-based elastomer is maleic acid-modified styrene-ethylene-butylene-styrene block copolymer.

7. The connector according to claim 1, wherein the thermoplastic elastomer composition further comprises 1-10 parts by mass of (C) polyphenylene ether component based on 100 total parts by mass of (A) styrene-based elastomer component and (B) syndiotactic polystyrene-based polymer component.

8. The connector according to claim 7, wherein (C) polyphenylene ether component is acid-modified polyphenylene ether.

9. The connector according to claim 8, wherein the acid-modified polyphenylene ether is fumaric acid-modified polyphenylene ether.

* * * * *